US010367967B2

(12) United States Patent
Valverde (10) Patent No.: US 10,367,967 B2
(45) Date of Patent: Jul. 30, 2019

(54) APPARATUS AND METHOD TO FACILITATE PRINTING OF CATALOG LABELS (71) Applicant: Lightning Bolt & Supply, Inc., Baton Rouge, LA (US)

(72) Inventor: Wesley Valverde, Baton Rouge, LA (US)

(73) Assignee: Lightning Bolt & Supply, Inc., Baton Rouge, LA (US)

(*) Notice: Subject to any disclaimer, the term of this patent is extended or adjusted under 35 U.S.C. 154(b) by 0 days.

(21) Appl. No.: 16/104,313

(22) Filed: Aug. 17, 2018

(65) Prior Publication Data

US 2019/0058810 A1 Feb. 21, 2019

Related U.S. Application Data (60) Provisional application No. 62/547,639, filed on Aug. 18, 2017.

(51) Int. Cl.
*G06F 3/12* (2006.01)
*H04N 1/32* (2006.01)
*H04N 1/00* (2006.01)
*G06K 19/06* (2006.01)

(52) U.S. Cl.
CPC ... *H04N 1/32112* (2013.01); *G06K 19/06028* (2013.01); *H04N 1/00411* (2013.01); *H04N 2201/3249* (2013.01); *H04N 2201/3269* (2013.01)

(58) Field of Classification Search
CPC ......... H04N 1/32112; H04N 1/00411; H04N 2201/3249; H04N 2201/3269; G06K 19/06028
USPC ........................................ 358/1.1–1.18, 402
See application file for complete search history.

(56) References Cited

U.S. PATENT DOCUMENTS

| | | | | |
|---|---|---|---|---|
| 2002/0077921 | A1* | 6/2002 | Morrison | G06Q 30/02 705/26.1 |
| 2004/0204987 | A1* | 10/2004 | Hill | G06Q 30/02 705/14.67 |
| 2004/0205138 | A1* | 10/2004 | Friedman | G06Q 30/02 709/206 |
| 2007/0124216 | A1* | 5/2007 | Lucas | G06Q 10/087 705/26.1 |
| 2013/0110744 | A1* | 5/2013 | Hendley | G06Q 10/06 705/413 |
| 2017/0132892 | A1* | 5/2017 | Vargas | G08B 13/2451 |

* cited by examiner

*Primary Examiner* — Gabriel I Garcia (57) ABSTRACT

An electronic device is provided. The electronic includes a memory storing a digital catalog. The electronic device also includes at least one processor coupled to the memory. The at least one processor is configured to determine whether a printer is associated with the digital catalog. The at least one processor is also configured to receive a request for an item or part number in the digital catalog. The at least one processor is further configured to transmit a barcode associated with the requested item or part number to the printer. In addition, the at least one processor is configured to transmit a print request to the printer to print the barcode.

20 Claims, 5 Drawing Sheets

APPARATUS AND METHOD TO FACILITATE PRINTING OF CATALOG LABELS

CROSS-REFERENCE TO RELATED APPLICATION AND PRIORITY CLAIM

This Application claims priority under 35 U.S.C. § 119(e) to U.S. Provisional Patent Application No. 62/547,639 entitled "APPARATUS AND METHOD TO FACILITATE PRINTING OF CATALOG LABELS" and filed on Aug. 18, 2017. The above-identified provisional patent application is hereby incorporated by reference in its entirety.

TECHNICAL FIELD

The present application relates generally to printing and, more specifically, to a network application for printing barcode labels associated with a product in a digital catalog or website.

BACKGROUND

In various industries, products are identified by a part or item number. A part or item number corresponding to a product allows the part or item to be quickly ordered, because the part or item number is specific to only a single part or item. In some cases, a barcode label may correspond to a part or item number. Barcode labels identify a product quickly because the barcode label can be scanned and immediately correspond to a specific part or item. However, this process may require that a user, who scans the barcode, is able to identify the corresponding part number.

SUMMARY

The different illustrative embodiments of the present disclosure provide a non-transitory computer readable medium configured to allow a user to print a barcode label by clicking on an item in a digital catalog.

An electronic device is provided. The electronic includes a memory storing a digital catalog. The electronic device also includes at least one processor coupled to the memory. The at least one processor is configured to determine that a printer is associated with the digital catalog if a match is found between printer identification information received from the printer and printer identification information stored in the memory. The at least one processor is also configured to determine that a printer is not associated with the digital catalog if a match is not found between printer identification information received from the printer and printer identification information stored in the memory. The at least one processor is further configured to receive a request for an item or part number in the digital catalog after determining that the printer is not associated with the digital catalog or after determining that the printer is associated with the digital catalog. In addition, the at least one processor is configured to transmit a barcode associated with the requested item or part number to the printer after determining that the printer is not associated with the digital catalog or after determining that the printer is associated with the digital catalog. The at least one processor is also configured to transmit a print request to the printer to print the barcode after determining that the printer is not associated with the digital catalog or after determining that the printer is associated with the digital catalog. The at least one processor is further configured to receive a barcode label print acknowledgment request after transmitting the print request to the printer to print the barcode if the printer is not associated with the digital catalog.

A method implemented by one or more processors of an electronic device is provided. The method includes determining, by the one or more processors, that a printer is associated with a digital catalog if a match is found between printer identification information received from the printer and printer identification information stored in a memory. The method also includes determining, by the one or more processors, that the printer is not associated with the digital catalog if a match is not found between printer identification information received from the printer and printer identification information stored in the memory. The method further includes receiving, by the one or more processors, a request for an item or part number in the digital catalog after determining that the printer is not associated with the digital catalog or after determining that the printer is associated with the digital catalog. In addition, the method includes transmitting, by the one or more processors, a barcode associated with the requested item or part number to the printer after determining that the printer is not associated with the digital catalog or after determining that the printer is associated with the digital catalog. The method also includes transmitting, by the one or more processors, a print request to the printer to print the barcode after determining that the printer is not associated with the digital catalog or after determining that the printer is associated with the digital catalog. The method further includes receiving, by the one or more processors, a barcode label print acknowledgment request after transmitting the print request to the printer to print the barcode if the printer is not associated with the digital catalog.

A non-transitory, computer-readable storage medium storing a digital catalog and one or more executable instructions is provided. The non-transitory, computer-readable storage medium storing the one or more executable instructions that, when executed by one or more processors of an electronic device, cause the one or more processors to determine that a printer is associated with the digital catalog if a match is found between printer identification information received from the printer and printer identification information stored in the memory. The non-transitory, computer-readable storage medium storing the one or more executable instructions that, when executed by one or more processors of an electronic device, also cause the one or more processors to determine that the printer is not associated with the digital catalog if a match is not found between printer identification information received from the printer and printer identification information stored in the memory. The non-transitory, computer-readable storage medium storing the one or more executable instructions that, when executed by one or more processors of an electronic device, further cause the one or more processors to receive a request for an item or part number in the digital catalog after determining that the printer is not associated with the digital catalog or after determining that the printer is associated with the digital catalog. In addition, the non-transitory, computer-readable storage medium storing the one or more executable instructions that, when executed by one or more processors of an electronic device, cause the one or more processors to transmit a barcode associated with the requested item or part number to the printer after determining that the printer is not associated with the digital catalog or after determining that the printer is associated with the digital catalog. The non-transitory, computer-readable storage medium storing the one or more executable instructions that, when executed by one or more processors of an electronic device, also cause the one or more processors to transmit a print request to the printer to print the barcode after determining that the printer is not associated with the digital catalog or after determining that the printer is associated with the digital catalog. The non-transitory, computer-readable storage medium storing the one or more executable instructions that, when executed by one or more processors of an electronic device, further cause the one or more processors to receive a barcode label print acknowledgment request after transmitting the print request to the printer to print the barcode if the printer is not associated with the digital catalog.

Other technical features may be readily apparent to one skilled in the art from the following figures, descriptions, and claim.

BRIEF DESCRIPTION OF THE DRAWINGS

For a more complete understanding of the present disclosure and its advantages, reference is now made to the following description taken in conjunction with the accompanying drawings, in which like reference numerals resent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure.

Barcode labels can be used as an identification method. A barcode, which may contain a diameter, thread pitch, length, product, grade/material, and plating, corresponds to a particular object or thing. Barcode labels can also be used as a method for tracking inventory. A person lacking advance training on a company's part number might not find any current methods of barcode labeling meaningful or helpful. There is a need in the field of printing to streamline the barcode printing process for users not formally trained on a company's part number.

Figure 1:
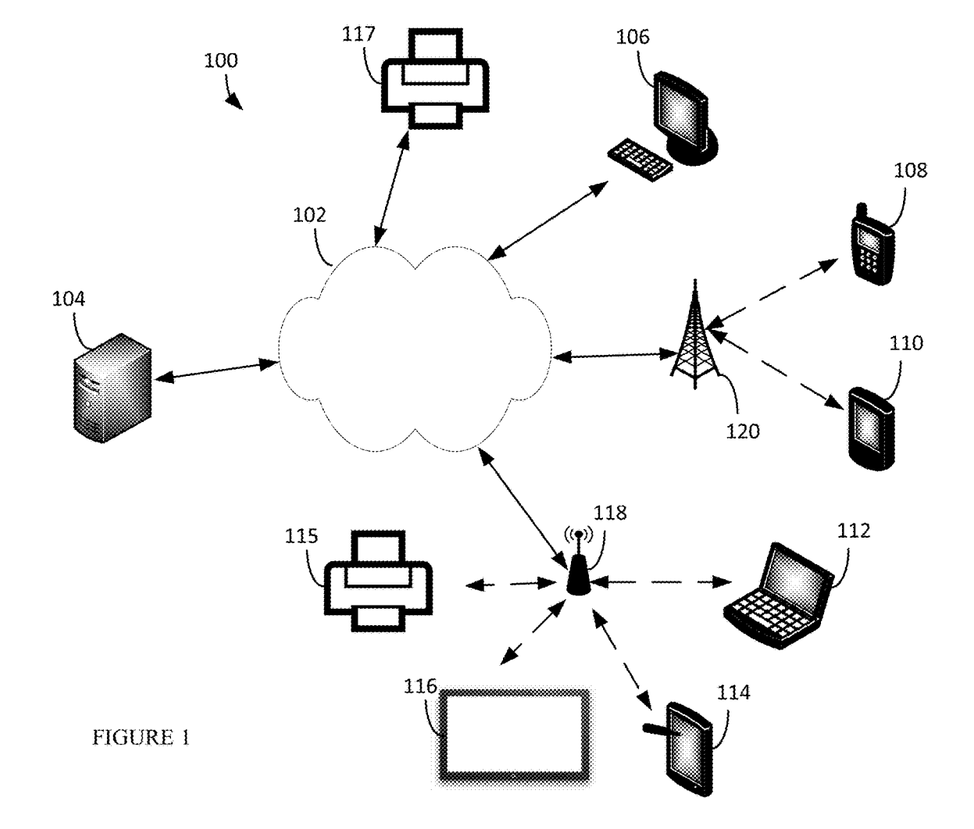
FIG. 1 illustrates an example computing system in accordance with various embodiments of the present disclosure.

FIG. 1 illustrates an example computing system 100 in accordance with various embodiments of the present disclosure. The embodiment of the computing system 100 shown in FIG. 1 is for illustration only. Other embodiments of the computing system 100 could be used without departing from the scope of this disclosure. As shown in FIG. 1, the computing system 100 includes a network 102, at least one server 104, and various electronic devices 106-117. The network 102 facilitates communication between various components in the computing system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various electronic devices 106-117. Each server 104 includes any suitable computing or processing device that can provide computing services for one or more electronic devices. Each server 104 could, for example, include one or more processing devices, one or more memories storing instructions and data, and one or more network interfaces facilitating communication over the network 102.

Each electronic device 106-117 represents any suitable computing or processing device that interacts with at least one server 104 or other computing device(s) over the network 102. In at least this example, the electronic devices 106-117 include a desktop computer 106, a mobile telephone or smartphone 108, a personal digital assistant (PDA) 110, a laptop computer 112, a smart television (TV) 114, a printer 115, a printer 117, and a tablet computer 116. However, any other or additional electronic devices could be used in the computing system 100.

In this example, some electronic devices 108-116 communicate indirectly with the network 102. For example, the electronic devices 108-110 communicate via one or more base stations 120, such as cellular base stations or eNodeBs. Also, the electronic devices 112-116 communicate via one or more wireless access points 118, such as IEEE 802.11 wireless access points. Note that these are for illustration only and that each electronic device could communicate directly with the network 102 or indirectly with the network 102 via any suitable intermediate device(s) or network(s).

Although FIG. 1 illustrates one example of a computing system 100, various changes may be made to FIG. 1. For example, the computing system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
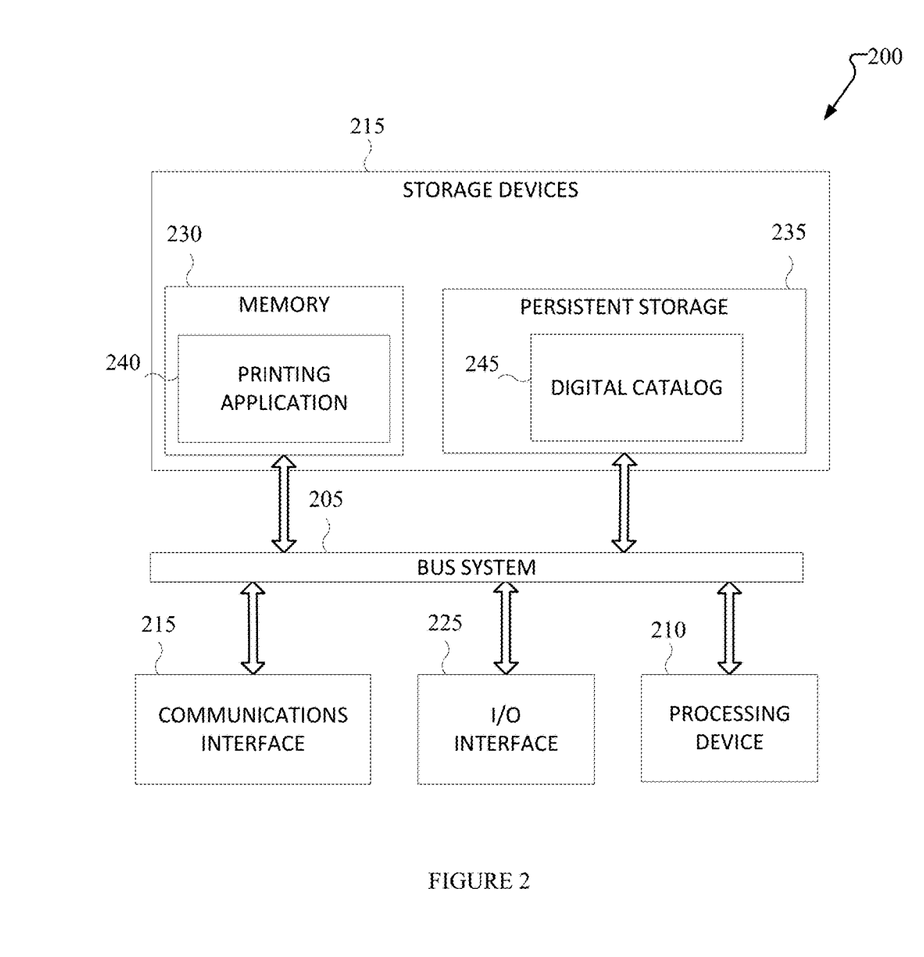
FIG. 2 illustrates an example device in a computing system in accordance with various embodiments of the present disclosure.

FIG. 2 illustrates an example device in a computing system in accordance with various embodiments of the present disclosure. In particular, FIG. 2 illustrates an example establishment server 200. In various embodiments, the establishment server 200 could represent the server 104 in FIG. 1, or any other device in FIG. 1. As shown in FIG. 2, the establishment server 200 includes a bus system 205, which supports communication between at least one processing device 210, at least one storage device 215, at least one communications interface 220, and at least one input/output (I/O) unit 225. The bus system 205 supports connections and/or communication between the at least one processing device 210, the at least one communications interface 220, the at least one I/O interface 225, a memory 230, and a persistent storage 235.

The processing device 210 executes instructions that may be loaded into the memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry. In certain embodiments, the processing device 210 may be configured to execute one or more barcode label printing operations or one or more barcode label generation operations contained in a printing application 240 that is stored in the memory 230 of the establishment server 200.

The communications interface 220 supports communications with other systems or devices. For example, the communications interface 220 could include a network interface card or a wireless transceiver facilitating communications over the network 102. The communications interface 220 may support communications through any suitable physical or wireless communication link(s).

The I/O interface 225 allows for input and output of data. For example, the I/O interface 225 may provide a connection for user input through a keyboard, mouse, keypad, touchscreen, or other suitable input device. The I/O interface 225 may also send output to a display, printer 115, printer 117, or other suitable output device.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The memory 230 includes a printing application 240. The persistent storage 235 may contain one or more components or devices supporting longer-term storage of data, such as a ready only memory, hard drive, flash memory, or optical disc. The persistent storage 235 includes the digital catalog 245 of the establishment. The digital catalog 245 includes all relevant information for barcode labels, for example, diameter, tread pitch, length, product, grade, material, plating, a product code (e.g., an alpha-numeric code), etc. The printing application 240 includes a set of instructions that, when executed by the processing device 210, enables a printing of a barcode or type of label (e.g., QR code) as described herein. For example, the printing application 240 may include one or more executable instructions that, when executed by the processing device 210, cause the processing device 210 to perform one or more barcode label printing operations described herein. As another example, the printing application 240 may include one or more executable instructions that, when executed by the processing device 210, cause the processing device 210 to perform one or more barcode label generation operations described herein.

Although FIG. 2 is described as representing the server 104 of FIG. 1, the same or similar structure could be used in one or more of the electronic devices 106-117. For example, a laptop 112 or desktop computer 106 could have the same or similar structure as that shown in FIG. 2. In addition, although FIG. 2 illustrates an example of devices in a computing system, various changes may be made to FIG. 2. For example, various components in FIG. 2 could be combined, further subdivided, or omitted and additional components could be added according to particular needs. In addition, as with computing and communication networks, electronic devices and servers can come in a wide variety of configurations, and FIG. 2 does not limit this disclosure to any particular electronic device or server.

Figure 3:
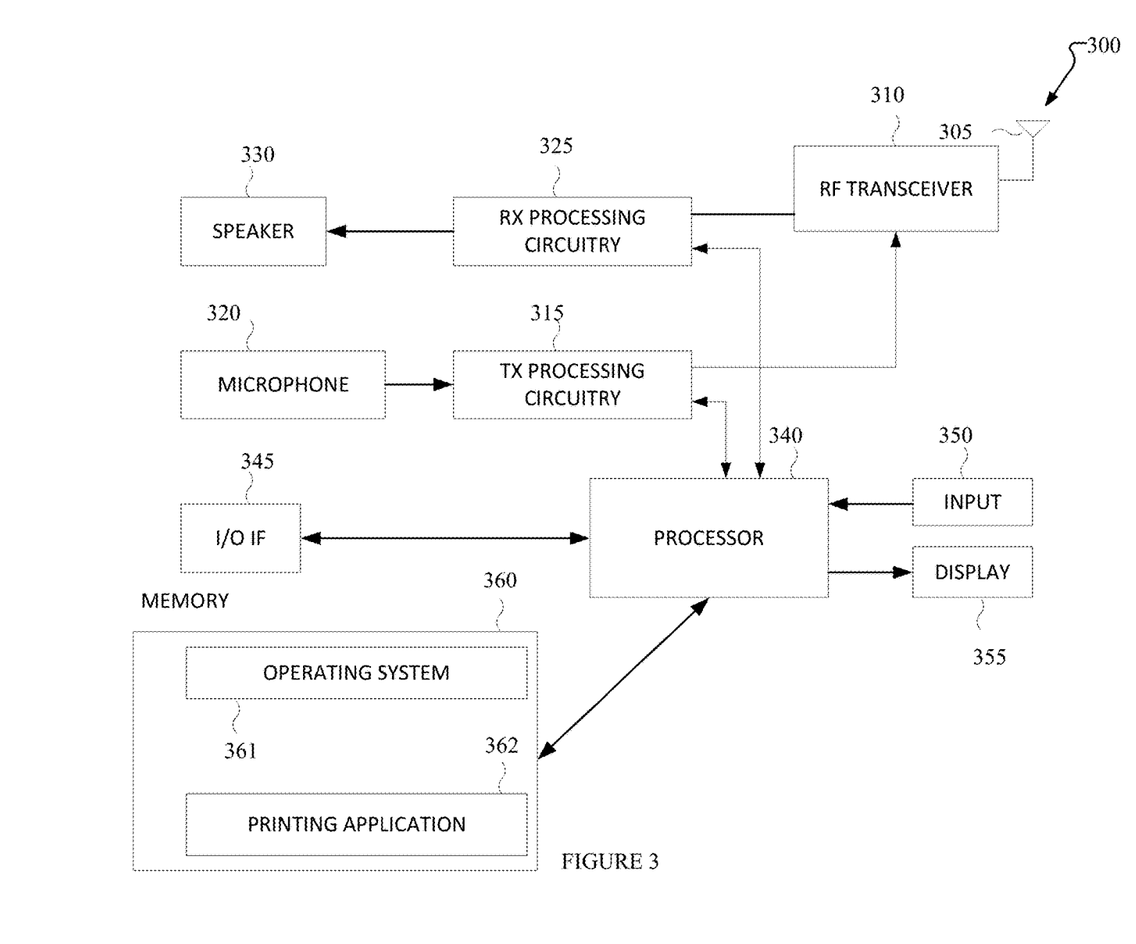
FIG. 3 illustrates an example device in a computing system in accordance with various embodiments of the present disclosure.

FIG. 3 illustrates an example device in a computing system according to various embodiments of the present disclosure. In particular, FIG. 3 illustrates an example electronic device 300. In various embodiments, the electronic device 300 could represent one or more of the electronic devices 106-117 illustrated in FIG. 1. As shown in FIG. 3, the electronic device 300 includes an antenna 305, a radio frequency (RF) transceiver 310, transmit (TX) processing circuitry 315, a microphone 320, and receive (RX) processing circuitry 325. The electronic device 300 also includes a speaker 330, a processor 340, an input/output (I/O) interface (IF) 345, an input 350, a display 355, and a memory 360. The memory 360 includes an operating system (OS) program 361 and one or more printing applications 362.

The antenna 305 transmits an RF signal transmitted by another component in the system to the RF transceiver 310. The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 or to the processor 340 for further processing.

The TX processing circuitry 315 receives analog or digital voice data from the microphone 320 or other outgoing baseband data from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller. In certain embodiments, the processor 340 may be configured to execute one or more barcode label printing operations contained in a printing application 362 that is stored in the memory 360 of the electronic device 300. In certain embodiments, the processor 340 may be configured to execute one or more barcode label generation operations contained in a printing application 362 that is stored in the memory 360 of the electronic device 300.

The processor 340 is also capable of executing other processes and programs resident in the memory 360. The processor 340 can move data into or out of the memory 360 as required by an executing process. In some embodiments, the processor 340 is configured to execute the printing applications 362 based on the OS program 361 or in response to signals received from external devices or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input 350 and the display unit 355. The operator of the electronic device 300 can use the input 350 to enter data into the electronic device 300. For example, the input 350 may be a keypad, touchscreen, button, etc. The display 355 may be a liquid crystal display or other display capable of rendering text and/or at least limited graphics, such as from web sites.

The memory 360 is coupled to the processor 340. Part of the memory 360 could include a random access memory (RAM), and another part of the memory 360 could include a flash memory or other read-only memory (ROM). The memory also includes the printing application 362 for printing barcode labels as described herein. The printing application 362 is a set of instructions that, when executed by the processor 340, enables a printing of a barcode or type of label (e.g., QR code) as described herein. For example, the printing application 362 may include one or more executable instructions that, when executed by the processor 340, cause the processor 340 to perform one or more barcode label printing operations described herein. As another example, the printing application 362 may include one or more executable instructions that, when executed by the processor 340, cause the processor 340 to perform one or more barcode label generation operations described herein. The printing application 362 may be at least similar to the printing application 240 illustrated in FIG. 2.

Although FIG. 3 illustrates an example of devices in a computing system, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, electronic devices and servers can come in a wide variety of configurations, and FIG. 3 does not limit this disclosure to any particular electronic device or server.

Figure 4:
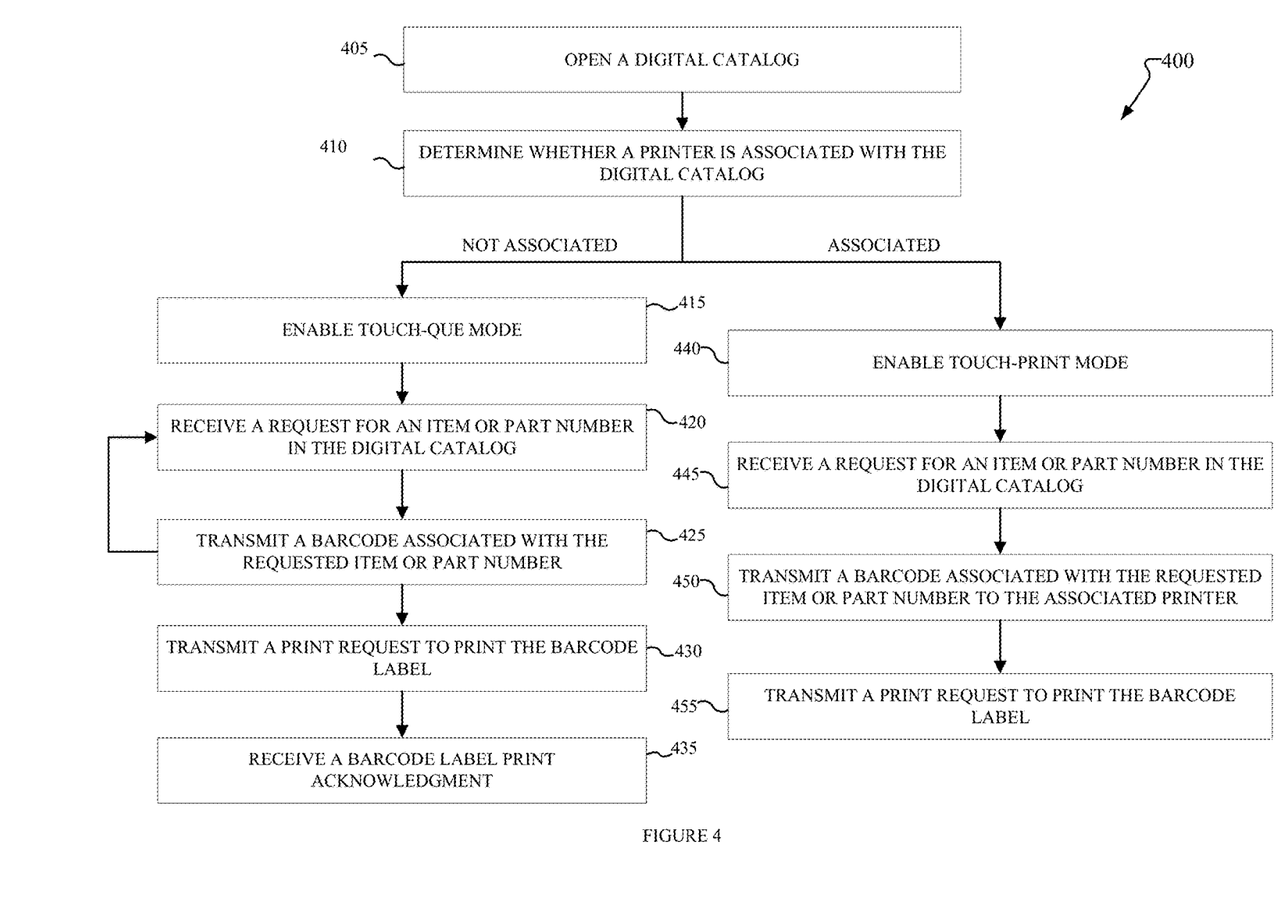
FIG. 4 illustrates an example method for one or more barcode label printing operations in accordance with various embodiments of the present disclosure.

FIG. 4 illustrates an example method 400 for executing one or more barcode label printing operations according to this disclosure. The method 400 shown in FIG. 4 is for illustration only. Other embodiments of the method 400 could be used without departing from the scope of this disclosure. In operation 405, an electronic device 300, using one or more processers 340 executing one or more barcode label printing operations, may open a digital catalog 245. The digital catalog 245 may contain a plurality of data associated with items and part numbers. For example, the digital catalog 245 may be stored in a memory 360 (e.g., in a printing application stored in a memory 360) of an electronic device 300. In response to receiving one or more commands, for example through a user interface, the electronic device 300 may access the digital catalog 245 stored in the memory 360 and generate the digital catalog 245 for display. The electronic device 300 may display, on a display screen, the digital catalog 245 for viewing. In certain embodiments, the electronic device 300 may have opened the digital catalog 245 when the digital catalog 245 is displayed on a display screen for viewing.

In various embodiments, the digital catalog 245 may display a list of items currently in stock at a user's warehouse, a list of items currently on sale for purchase from a user's supplier, a list of items that have been previously purchased by a user, a list of items that have been arbitrarily chosen by a user, and/or any other data associated with items and part numbers. For example, the digital catalog 245 may display a list of different size bolts that have previously been purchased by user. When inventory for one or more of the different size bolts previously purchased by the user is depleted to a level below a threshold level, the electronic device 300, using the one or more processors 340 executing one or more barcode label printing operations, may receive one or more selections each associated with a specific sized bolt through the digital catalog 245 to perform one or more additional barcode label printing operations described herein. As another example, the digital catalog 245 may contain a list of bolts that are currently in stock with a supplier. The electronic device 300, using one or more processors 340 executing one or more barcode label printing operations, may receive one or more selections each associated with a specific bolt through the digital catalog 245 to perform one or more additional barcode label printing operations described herein.

In operation 410, the electronic device 300, using one or more processors 340 executing one or more barcode label printing operations, may determine whether or not a printer (e.g., a printer 115, a printer 117) is associated with the digital catalog 245. In certain embodiments, the digital catalog 245 may have previously been linked to one or more printers that are associated with a specific supplier or a specific purchaser (e.g., a customer) displaying items in the digital catalog 245. The digital catalog 245 may be linked to the one or more printers by storing, in a memory 360 of the electronic device 300, printer identification information for each linked printer. Printer identification information may include at least one of an email address associated with a printer, an internet protocol (IP) address associated with a printer, an IMEI number associated with a printer, a MAC address associated with a printer, a pointer associated with a data port of a printer, or the like. Each of the one or more linked printers may include any suitable computing or processing device that can provide printing services for one or more electronic devices (e.g., the one or more electronic devices 106-116).

After the electronic device 300 opens the digital catalog 245, the electronic device 300 may electronically search for and identify one or more printers (e.g., a printer 115, a printer 117) that are electronically accessible to the electronic device 300 for electronic communication between one or more of the printers and the electronic device 300. An electronic device 300 may electronically communicate with a printer using at least one of a near field communication (NFC) protocol, a private wireless local area network (WLAN), a public WLAN, a wired connection, a cellular network, or the like. After identifying one or more printers that are electronically accessible by the electronic device 300, the electronic device 300 may transmit a printer identification request signal to each of the identified one or more printers.

Printers that are associated with the digital catalog 245 may include a memory storing one or more executable instructions that, when executed by one or more processors, cause the one or more processors of the printer to also perform one or more barcode label printing operations. For example, a printer (e.g., a printer 115, a printer 117) associated with the digital catalog 245 may transmit a printer identification response signal including printer identification information that will match printer identification information stored in the memory 360 of the electronic device 300. In response to receiving a printer identification request signal, each of the one or more printers may transmit, to the electronic device 300, a printer identification response signal containing printer identification information that is unique to that printer. In response to receiving a printer identification response signal from each of the one or more printers, the electronic device 300 may compare each of the received printer identification information contained in each of the printer identification response signals with the printer identification information stored in the memory 360 of the electronic device 300. The electronic device 300 may determine whether printer identification information, received from a printer (e.g., a printer 115, a printer 117), matches printer identification information stored in the memory 360.

If the electronic device 300 matches printer identification information, received from a printer (e.g., a printer 115, a printer 117), with printer identification information stored in the memory 360 of the electronic device 300, then the electronic device 300 may determine that the printer that transmitted the matched printer identification information is a printer that is associated with the digital catalog 245. In certain embodiments, after determining that the printer that transmitted the matched printer identification information is a printer that is associated with the digital catalog 245, the electronic device 300 may perform one or more additional barcode label printer operations using that printer (e.g., transmit and print information using that printer) as described herein.

In certain embodiments, a printer (e.g., a printer 115, a printer 117) that is associated with the digital catalog 245 may also be a printer that is associated with a supplier of one or more items displayed in the digital catalog 245. Thus, printing to inform a supplier of an order for one or more items may be performed at the location of the supplier while item selection and ordering by a digital catalog user is performed in the field or as the digital catalog users determines that an item is needed allowing for a quick and efficient item order or reordering processes between vendors and digital catalog users. In certain embodiments, a printer (e.g., a printer 115, a printer 117) that is associated with the digital catalog 245 may also be a printer that is associated with a customer that may purchase one or more items displayed in the digital catalog 245. Thus, printing to inform a customer that they may purchase one or more items may be performed at the location of the customer while item selection and ordering by a digital catalog user is performed in the field or as the digital catalog users determines that an item is needed allowing for a quick and efficient item order or reordering processes between customers and digital catalog users.

In certain embodiments, a single printer or a single group of printers may be associated with a digital catalog 245. For example, the digital catalog 245 may only display items from a single supplier. Thus, only a single printer or a single group of printers associated with the single supplier may also be associated with the digital catalog 245. In certain embodiments, two or more printers or two or more distinct groups of printers may be associated with a digital catalog 245. For example, the digital catalog 245 may display items from two or more suppliers including a first supplier and a second supplier. Thus, when the electronic device, using one or more processors, performs one or more barcode label printing operations with respect to a first displayed item displayed in the digital catalog 245 and associated with the first supplier of the two or more suppliers, the electronic device 300, using the one or more processors 340, performs one or more barcode label printing operations with respect to a first printer or a first group of printers associated with the first supplier. In this case, the electronic device 300, using the one or more processors 340, when performing one or more barcode labeling operations with respect to the first displayed item displayed in the digital catalog 245 and associated with the first supplier may not perform one or more barcode label printing operations with respect to a second printer or a second group of printers associated with the second supplier of the two or more suppliers.

In certain embodiments, in response to receiving a printer identification response signal from each of the one or more printers, the electronic device 300 may compare each of the received printer identification information contained in each of the printer identification response signals with the printer identification information stored in the memory 360 of the electronic device 300. If none of the received printer identification information, received from the one or more printers, matches printer identification information stored in the memory 360 of the electronic device 300, then the electronic device 300 may determine that no printers that transmitted the printer identification information are printers (e.g., a printer 115, a printer 117) that are associated with the digital catalog 245. In certain embodiments, after determining that none of the one or more printers that transmitted the printer identification information are printers that are associated with the digital catalog 245, the electronic device 300 may perform one or more additional barcode label printer operations using a printer of the one or more printers (e.g., a printer 115, a printer 117) that is not associated with the digital catalog 245 as described herein.

Additionally, or alternatively, for example, after the electronic device 300 has opened the digital catalog, when no printers are linked to the digital catalog 245, when no printer identification information is stored in a memory 360 of the electronic device 300, or when no received printer identification information matches printer identification information stored in a memory 360 of the electronic device 300, the electronic device 300, using the one or more processors 340 executing one or more barcode label printing operations, may electronically search for and identify one or more printers (e.g., a printer 115, a printer 117) that are electronically accessible to the electronic device 300 for electronic communication between one or more of the printers and the electronic device 300. After identifying one or more printers that are electronically accessible by the electronic device 300, the electronic device 300 may transmit a printer catalog association request signal to each of the identified one or more printers.

Printers that are associated with the digital catalog 245 may include a memory storing one or more executable instructions that, when executed by one or more processors, cause the one or more processors of the printer to also perform one or more barcode label printing operations. For example, a printer associated with the digital catalog 245 may transmit a printer association acknowledgment signal to the electronic device 300 in response to receiving a printer catalog association request signal from the electronic device 300. Thus, in response to receiving a printer catalog association request signal, a printer of the one or more printers that is associated with the digital catalog 245 may transmit, to the electronic device 300, a printer association acknowledgment response signal containing printer identification information that is unique to that printer. In response to receiving a printer association acknowledgment response signal from a printer, the electronic device 300 may determine that the printer that transmitted the printer association acknowledgment response signal is a printer that is associated with the digital catalog 245. In certain embodiments, after determining that a printer is associated with the digital catalog 245, the electronic device 300 may perform one or more additional barcode label printer operations using that printer (e.g., transmit and print information using that printer) as described herein. It should be understood that one or more the printers described herein may include any suitable computing or processing device that can provide printing services for one or more electronic devices (e.g., electronic devices 106-116).

In certain embodiments, the electronic device 300, using one or more processors 340 executing one or more barcode label printing operations, may receive no printer association acknowledgment response signals from any printer (e.g., after a predetermined amount of time or after transmitting a predetermined amount of printer catalog association request signals to each of the one or more printers). In this case, the electronic device 300 may determine that no printers that are electronically accessible by the electronic device are printers that are associated with the digital catalog 245. In certain embodiments, after determining that none of the one or more printers that are electronically accessible by the electronic device 300 are printers that are associated with the digital catalog 245, the electronic device 300 may perform one or more additional barcode label printer operations using a printer of the one or more printers that are not associated with the digital catalog 245 as described herein.

If the electronic device 300, using one or more processors 340 executing one or more barcode label printing operations, determines that no printers are associated with the digital catalog 245, then, at operation 415, the electronic device 300, using one or more processors 340 executing one or more barcode label printing operations, initiates or enables a Touch-Que mode. Under Touch-Que Mode, a printer 117 may be located at a local location. In certain embodiments, a local location may include a location accessible to a private WLAN, within a range of NFC, within a range of a cellular base-station, or the like. Alternatively, under Touch-Que Mode, a printer 117 may be located at a remote location. In certain embodiments, a remote location may include a location outside of a private WLAN, outside a range of NFC, outside the range of a cellular base-station, or the like. The electronic device 300, using one or more processors 340 executing one or more barcode label printing operations, while enabling the Touch-Que mode may utilize a custom "find and replace" script. Utilizing the "find and replace" script, the electronic device 300 may identify a location of each item or part number in the digital catalog 245. The electronic device 300 utilizing the "find and replace" script may insert a hyperlink containing a custom script (e.g., a Visual Basic script) for each item or part number in the digital catalog 245. The electronic device 300 utilizing the script, along with the hyperlink, may provide a simple and fast user experience when a user using the electronic device 300 requests a barcode label to be printed. In various embodiments, the electronic device 300, utilizing the script, may be configured to find an appropriate pdf client file (e.g. a Foxit pdf file), turn off any visual basic generated prompts, force a pdf client, disable resizing features, bypass a Disk Operating System ("DOS"), bypass a command line box, or the like. The user experience is free of extra commands and pop-ups, allowing for a simple and fast experience.

In certain embodiments, the electronic device 300, using one or more processors 340 executing one or more barcode label printing operations, may utilize the script to send an item selected by a user to a hidden database. The hidden database may be appended to a text file. The hidden database may serve as a "shopping cart" for a user, collecting a plurality of selected items until a user is ready to submit a request to a vendor or printer. The items contained in the hidden database may be uploaded upon the user submitting the request (i.e. clicking a "Submit" button).

In operation 420, the electronic device 300, using one or more processors 340 executing one or more barcode label printing operations, may receive a selection through the digital catalog 245 for an item or part number. For example, the electronic device 300 may display the digital catalog 245 on a touch screen display. In response to receiving a touch input on a picture of an item displayed in the digital catalog 245 on the touch screen display, on text (e.g., a hyperlink) associated with an item displayed in the digital catalog 245 on the touch screen display, or on an area of the digital catalog 245 that is designated to receive a touch input for an item displayed in the digital catalog 245 (e.g., a check box), the electronic device 300 may determine that a selection of that item has been received, for example, by a user operating the electronic device 300.

In operation 425, the electronic device 300, using one or more processors executing one or more barcode label printing operations, may transmit a signal including a command to one or more servers (e.g., server 104) to transmit uploaded information associated with the selected item or part number displayed in the digital catalog 245 to an identified printer that is not associated with the digital catalog 245 (e.g., a printer associated with a customer). The electronic device 300 may transmit the uploaded information to a printer that is not associated with the digital catalog 245 (e.g., a printer associated with a customer) via an internet connection. In various embodiments, the uploaded information may be a barcode or a plurality of barcodes corresponding to selected items from the hidden database that were previously selected. In various embodiments, the electronic device 300, using one or more processors 340 executing one or more barcode label printing operations, may transmit an additional signal including an additional command to one or more servers (e.g., server 104) to transmit uploaded information associated with an additional item or an additional part number in the digital catalog 245. In these embodiments, the electronic device 300 may perform operation 420 again. The electronic device 300, using one or more processors 340 executing one or more barcode label printing operations, may continue at least operations 420 and 425 multiple times until each requested item or part number has been received. In certain embodiments, the printer that is not associated with the digital catalog 245 may receive the barcode or barcodes, and the requested item or part numbers are imported into label printing software.

In operation 430, the electronic device 300, using one or more processors 340 executing one or more barcode label printing operations, may transmit a print request to print the barcode label or the barcode labels at the printer that is not associated with the digital catalog 245. For example, after the electronic device 300 transmits a barcode associated with a requested item or part number to a printer that is not associated with the digital catalog 245, the electronic device 300 may transmit a print request to the printer that is not associated with the digital catalog 245. In operation 435, the electronic device 300, using one or more processors 340 executing one or more barcode label printing operations, may receive a barcode label print acknowledgment message. For example, after the electronic device 300 transmits a print request to the printer that is not associated with the digital catalog 245, the printer that is not associated with the digital catalog 245 may print one or more barcode labels received from the electronic device 300. After the one or more barcode labels received from the electronic device 300 has been printed, the electronic device 300 may receive a barcode label print acknowledgment message indicating that the one or more barcode labels have been printed. In various embodiments, a user associated with the electronic device 300 may also receive the printed barcode or barcodes in the mail, by picking them up at the vendor's establishment, or by any other means. For example, the supplier may mail the printed barcode label to the user's establishment, approximate place of purchase, a home address, or another address on file.

If the electronic device 300, using one or more processors 340 executing one or more barcode label printing operations, determines that at least one printer (e.g., a printer 115, a printer 117) is associated with the digital catalog 245, then, at operation 440, the electronic device 300, using one or more processors 340 executing one or more barcode label printing operations, initiates or enables a Touch-Print Mode. Under Touch-Print Mode, a printer 117 may be located at a remote location. In certain embodiments, a remote location may include a location outside of a private WLAN, outside a range of NFC, outside the range of a cellular base-station, or the like. Alternatively, Under Touch-Point Mode a printer 117 may be located at a local location. In certain embodiments, a local location may include a location accessible to a private WLAN, within a range of NFC, within a range of a cellular base-station, or the like.

The electronic device 300, initializing the Touch-Print mode may utilize a custom "find and replace" script. The electronic device 300 may use the "find and replace" type script to identify a location of each item or part number in the digital catalog 245. The electronic device 300 may utilize the script to insert a hyperlink containing a custom Visual Basic script for each item or part number in the digital catalog 245. The electronic device 300 utilizing the script, along with the hyperlink, may provide a simple and fast user experience when a user using the electronic device 300 requests a barcode label to be printed. In various embodiments, the electronic device 300, utilizing the script, may be configured to find an appropriate pdf client file (e.g. a Foxit pdf file), turn off any visual basic generated prompts, force a pdf client, disable resizing features, bypass a Disk Operating System ("DOS"), bypass a command line box, or the like. The user experience is free of extra commands and pop-ups, allowing for a simple and fast experience.

In some embodiments, the electronic device 300 may store a barcode label locally on an aspect of the storage device 215 or the memory 360. In other embodiments, the electronic device may store a barcode label on the server 104. In embodiments where the barcode label is stored on the server 104, the barcode label may be accessed via the network 102.

In operation 445, the electronic device 300, using one or more processors 340 executing one or more barcode label printing operations, may receive a selection through the digital catalog 245 for an item or part number. For example, the electronic device 300 may display the digital catalog 245 on a touch screen display. In response to receiving a touch input on a picture of an item displayed in the digital catalog 245 on the touch screen display, on text (e.g., a hyperlink) associated with an item display in the digital catalog 245 on the touch screen display, or on an area of the digital catalog 245 that is designated to receive a touch input for an item displayed in the digital catalog 245 (e.g., a check box), the electronic device 300 may determine that a selection of that item has been received, for example, from a user operating the electronic device 300.

In operation 450, the electronic device 300, using one or more processors 340 executing one or more barcode label printing operations, may transmit a signal including a command to one or more servers (e.g., server 104) to transmit uploaded information associated with the selected item or part number displayed in the digital catalog 245 to an identified printer that is associated with the digital catalog 245 (e.g., a printer associated with a supplier). The electronic device 300 may transmit the uploaded information to a printer that is associated with the digital catalog 245 (e.g., a printer associated with a supplier) via an internet connection. In various embodiments, the electronic device 300, using one or more processors 340 executing one or more barcode label printing operations, may transmit an additional signal including an additional command to one or more servers (e.g., server 104) to transmit uploaded information associated with an additional item or an additional part number in the digital catalog 245. In certain embodiments, the printer that is associated with the digital catalog 245 may receive the barcode or barcodes, and the requested item or part numbers are imported into label printing software.

In operation 455, the electronic device 300, using one or more processors 340 executing one or more barcode label printing operations, may transmit a print request to print the barcode label or the barcode labels at the printer that is associated with the digital catalog 245. For example, after the electronic device 300 transmits a barcode associated with a requested item or part number to a printer that is associated with the digital catalog 245, the electronic device 300 may transmit a print request to that printer that is associated with the digital catalog 245. Although FIG. 4 illustrates one example method 400, various changes may be made to FIG. 4. For example, although depicted herein as a series of steps, the steps of method 400 could overlap, occur in parallel, occur in a different order, or occur multiple times.

Figure 5:
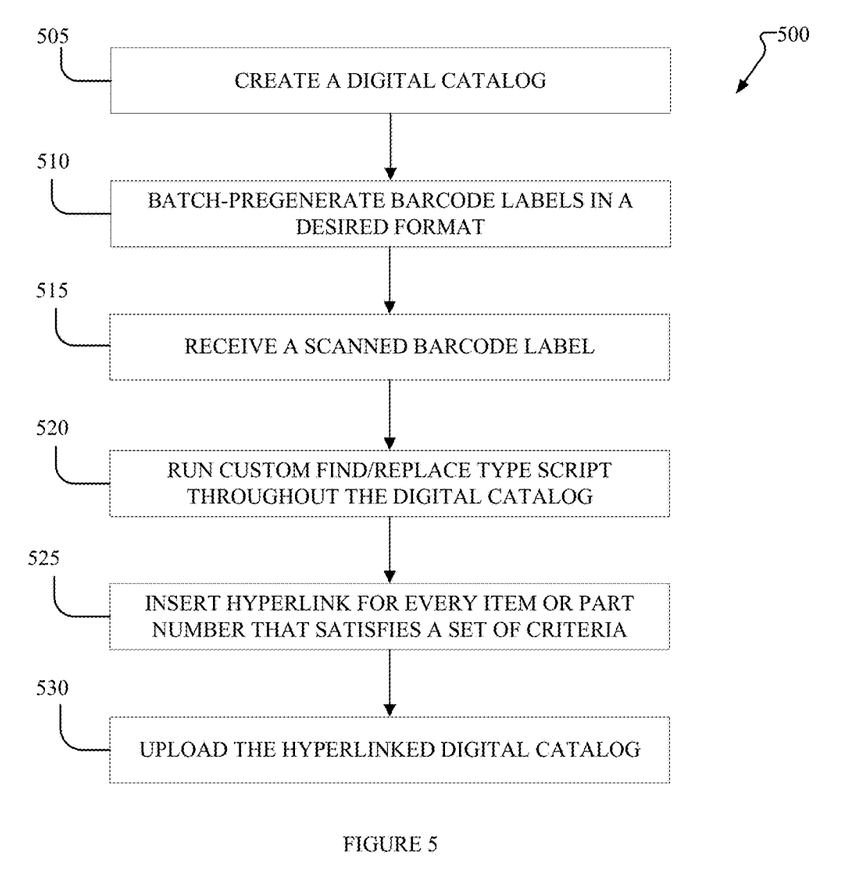
FIG. 5 illustrates an example method for executing one or more barcode label generation operations in accordance with various embodiments of the present disclosure.

FIG. 5 illustrates a method 500 for executing one or more barcode label generation operations in accordance with various embodiments of the present disclosure. The embodiment of the method 500 shown in FIG. 5 is for illustration only. Other embodiments of the method 500 could be used without departing from the scope of this disclosure.

In operation 505, an establishment server 200, utilizing one or more processing devices 210 executing one or more barcode label generation operations, may generate or create a digital catalog 245. The digital catalog 245 may be stored on an electronic device 300 and displayed to identify various parts and item numbers using a barcode. Information in the digital catalog 245 may include, but may not be limited to, all relevant information for barcode labels, such as diameter, tread pitch, length, product, grade, material, plating, a product code (e.g., an alpha-numeric code), etc. In operation 510, the establishment server 200, utilizing one or more processing devices 210 executing one or more barcode label generation operations, may batch pre-generated barcode labels in a desired format. The barcode labels may be in any one of a number of formats, and may contain a diameter, thread pitch, length, product, grade/material, and/or plating, corresponding to a particular object or item. In some embodiments, the barcode labels may be stored locally on an aspect of the storage device 215. In other embodiments, the barcode labels may be stored on the server 104.

In operation 515, the establishment server 200 receives a scanned barcode label. In certain embodiments, the barcode label is transmitted from an electronic device 300. In certain embodiments, a user has scanned the barcode label using an electronic device 300. In operation 520, the establishment server 200, utilizing one or more processing device 210 executing one or more barcode label generation operations, may execute a custom find and replace type script throughout the digital catalog 245. The establishment server 200 may utilize the "find and replace" type script to identify a location of each item or part number in the digital catalog 245.

In operation 525, the establishment server 200, utilizing one or more processing device 210 executing one or more barcode label generation operations, may insert a hyperlink for each item or part number that satisfies a set of criteria. The hyperlink may contain a custom scrip for each item or part number in the digital catalog 245. In various embodiments, the script may be configured to find an appropriate pdf client file (e.g. a Foxit pdf file), turn off any generated prompts, force a pdf client, disable resizing features, and/or bypass a Disk Operating System ("DOS") or a command line box. In operation 530, the establishment server 200 uploads the hyperlinked digital catalog to an electronic device 300. Although FIG. 5 illustrates one example method 500, various changes may be made to FIG. 5. For example, although depicted herein as a series of steps, the steps of method 500 could overlap, occur in parallel, occur in a different order, or occur multiple times.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions a\and embodiments described herein can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

What is claimed is:

1. An electronic device comprising:
   a memory storing a digital catalog;
   at least one processor coupled to the memory, wherein the at least one processor is configured to:
   determine that a printer is associated with the digital catalog if a match is found between printer identification information received from the printer and printer identification information stored in the memory,
   determine that the printer is not associated with the digital catalog if a match is not found between printer identification information received from the printer and printer identification information stored in the memory,
   receive a request for an item or part number in the digital catalog after determining that the printer is not associated with the digital catalog or after determining that the printer is associated with the digital catalog,
   transmit a barcode associated with the requested item or part number to the printer after determining that the printer is not associated with the digital catalog or after determining that the printer is associated with the digital catalog,
   transmit a print request to the printer to print the barcode after determining that the printer is not associated with the digital catalog or after determining that the printer is associated with the digital catalog, and
   if the printer is not associated with the digital catalog, receive a barcode label print acknowledgment request after transmitting the print request to the printer to print the barcode.

2. The electronic device of claim 1, wherein the at least one processor is configured to receive the request for the item or the part number in the digital catalog through at least one of a touch input on a picture of an item displayed in the digital catalog on a touch screen display, a touch input on text associated with an item displayed in the digital catalog on the touch screen display, or a touch input on an area of the digital catalog that is designated to receive a touch input for an item displayed in the digital catalog.

3. The electronic device of claim 1, wherein the item or part number in the digital catalog comprises script including a hyperlink containing a custom Visual Basic script that is unique to a particular item or part number.

4. The electronic device of claim 1, wherein when the printer is not associated with the digital catalog, the printer is located at a remote location, and wherein when the printer is associated with the digital catalog, the printer is located at a local location.

5. The electronic device of claim 1, wherein the barcode is indicative of at least one of a part number of an item number of an item to be purchased.

6. The electronic device of claim 1, wherein when the printer is not associated with digital catalog, the at least one processor is further configured to transmit a barcode associated with the requested item or part number to a server, and wherein the at least one processor is configured to transmit the barcode associated with the requested item or part number to the printer by directing the server to transmit the requested item or part number from the server to the printer.

7. The electronic device of claim 1, wherein the barcode is indicative of at least one of a diameter, a tread pitch, a length, a product, a grade, a material, a plating, or a product code associated with an item.

8. A method implemented by one or more processors of an electronic device, the method comprising:
- determining, by the one or more processors, that a printer is associated with a digital catalog if a match is found between printer identification information received from the printer and printer identification information stored in a memory;
- determining, by the one or more processors, that the printer is not associated with the digital catalog if a match is not found between printer identification information received from the printer and printer identification information stored in the memory;
- receiving, by the one or more processors, a request for an item or part number in the digital catalog after determining that the printer is not associated with the digital catalog or after determining that the printer is associated with the digital catalog;
- transmitting, by the one or more processors, a barcode associated with the requested item or part number to the printer after determining that the printer is not associated with the digital catalog or after determining that the printer is associated with the digital catalog;
- transmitting, by the one or more processors, a print request to the printer to print the barcode after determining that the printer is not associated with the digital catalog or after determining that the printer is associated with the digital catalog; and
- if the printer is not associated with the digital catalog, receiving, by the one or more processors, a barcode label print acknowledgment request after transmitting the print request to the printer to print the barcode.

9. The method of claim 8, wherein the request for the item or the part number in the digital catalog is received through at least one of a touch input on a picture of an item displayed in the digital catalog on a touch screen display, a touch input on text associated with an item displayed in the digital catalog on the touch screen display, or a touch input on an area of the digital catalog that is designated to receive a touch input for an item displayed in the digital catalog.

10. The method of claim 8, wherein the item or part number in the digital catalog comprises script including a hyperlink containing a custom Visual Basic script that is unique to a particular item or part number.

11. The method of claim 8, wherein when the printer is not associated with the digital catalog, the printer is located at a remote location, and wherein when the printer is associated with the digital catalog, the printer is located at a local location.

12. The method of claim 8, wherein the barcode is indicative of at least one of a part number of an item number of an item to be purchased.

13. The method of claim 8, wherein when the printer is not associated with digital catalog, the method further includes transmitting, by the one or more processors, a barcode associated with the requested item or part number to a server, and wherein transmitting, by the one or more processors, the barcode associated with the requested item or part number to the printer comprises directing the server to transmit the requested item or part number from the server to the printer.

14. A non-transitory, computer-readable storage medium storing a digital catalog and one or more executable instructions that, when executed by one or more processors of an electronic device, cause the one or more processors to:
- determine that a printer is associated with the digital catalog if a match is found between printer identification information received from the printer and printer identification information stored in a memory;
- determine that the printer is not associated with the digital catalog if a match is not found between printer identification information received from the printer and printer identification information stored in the memory;
- receive a request for an item or part number in the digital catalog after determining that the printer is not associated with the digital catalog or after determining that the printer is associated with the digital catalog;
- transmit a barcode associated with the requested item or part number to the printer after determining that the printer is not associated with the digital catalog or after determining that the printer is associated with the digital catalog;
- transmit a print request to the printer to print the barcode after determining that the printer is not associated with the digital catalog or after determining that the printer is associated with the digital catalog; and
- if the printer is not associated with the digital catalog, receive a barcode label print acknowledgment request after transmitting the print request to the printer to print the barcode.

15. The non-transitory, computer-readable storage medium of claim 14, wherein the one or more executable instructions, when executed by the one or more processors of the electronic device, cause the one or more processors to:
- receive the request for the item or the part number in the digital catalog through at least one of a touch input on a picture of an item displayed in the digital catalog on a touch screen display, a touch input on text associated with an item displayed in the digital catalog on the touch screen display, or a touch input on an area of the digital catalog that is designated to receive a touch input for an item displayed in the digital catalog.

16. The non-transitory, computer-readable storage medium of claim 14, wherein the item or part number in the digital catalog comprises script including a hyperlink containing a custom Visual Basic script that is unique to a particular item or part number.

17. The non-transitory, computer-readable storage medium of claim 14, wherein when the printer is not associated with digital catalog, the printer is located at a remote location, and wherein when the printer is associated with digital catalog, the printer is located at a local location.

18. The non-transitory, computer-readable storage medium of claim 14, wherein when the printer is not associated with digital catalog, the one or more executable instructions, when executed by the one or more processors of the electronic device, cause the one or more processors to transmit a barcode associated with the requested item or part number to a server, and wherein the one or more executable instructions, when executed by the one or more processors of the electronic device, cause the one or more processors to transmit the barcode associated with the requested item or part number to the printer by directing the server to transmit the requested item or part number from the server to the printer.

19. The non-transitory, computer-readable storage medium of claim 14, wherein the barcode is indicative of at least one of a diameter, a tread pitch, a length, a product, a grade, a material, a plating, or a product code associated with an item.

20. The non-transitory, computer-readable storage medium of claim 14, wherein the electronic device is a mobile electronic device.

\* \* \* \* \*